2,789,107
RUBBER STABILIZERS

Elliott L. Weinberg, Long Island City, N. Y., and Louis A. Tomka, Westfield, N. J., assignors to Metal & Thermit Corporation, New York, N. Y., a corporation of New Jersey No Drawing. Application January 29, 1954, Serial No. 407,157

13 Claims. (Cl. 260—45.75)

The present invention relates to the stabilization of elastomers against degradation brought about by aging, especially of rubber compounds of the class consisting of natural rubber and rubbery synthetic polymers. Such properties of the elastomers as elongation, tensile strength, modulus, tackiness, surface crackings, etc., are adversely affected by aging in the absence of stabilizers normally termed rubber anti-oxidants.

It has been found that hydrocarbontin carboxylates and polycarboxylates—or to state it in another fashion, organotin salts of carboxylic and polycarboxylic acids are effective anti-oxidants for natural and synthetic rubbers.

The hydrocarbon group of the hydrocarbontin radical may be any alkyl, aryl or aralkyl group, such as: methyl, ethyl, butyl, propyl, lauryl, tolyl, xylyl, phenyl, naphthyl, phenylethyl. The carboxylic acids whose organotin salts are the stabilizers of this invention may include any aromatic or aliphatic acid, either monobasic or dibasic, such as, for example, maleic, lauric, acetic, ricinoleic, oleic, phthalic, stearic, palmitic or linoleic acids. Mixed salts of maleic acid and a monobasic acid, as described in copending application Serial No. 332,763, are useful. Also effective are the organotin salts of partially esterified polybasic acids.

The stabilizers are extremely effective as rubber-anti-oxidants as demonstrated by their stabilizing ability at exceptionally low concentrations, and are effective at .05% to 5% based on the weight of the rubber with a preferred range of .1 to 1% based on the weight of the rubber.

These hydrocarbontin carboxylates and polycarboxylates, when used as rubber anti-oxidants, are nondiscoloring, and thereby permit the manufacture of white stocks.

The stabilizers herein described can effectively be used as anti-oxidants with elastomers and more specifically with rubbery materials of the class consisting of (a) natural rubber, (b) rubber-like copolymers of 1,3 butadiene and styrene (GR-S type), and (c) rubber-like copolymers of 1,3 butadiene and acrylonitrile (nitrile type), and (d) rubber-like homopolymers of chloroprene (neoprene type).

The stabilizers may be milled into the rubbery materials defined above, without other additions, for the purpose of preventing degradation during storage. More commonly, they will be incorporated with other materials during compounding.

Any suitable compounding formulation may be employed. A specific example of a natural rubber composition, in which the stabilizers are effective as an anti-oxidant, is as follows:

|  | Parts by weight |
|---|---|
| Thin, pale crepe | 100.0 |
| Zinc oxide (lead-free) | 5.0 |
| Stearic acid | 1.0 |
| Titanium dioxide (anatase) | 10.0 |
| Insoluble sulfur | 3.0 |
| Benzothiazyl disulfide | 1.0 |
| Tetramethylthiuram disulfide | 0.1 |

To this composition may be added any one of the stabilizers set forth above, in proportions of 0.05% to 5% by weight, based on the weight of the rubber ingredient of said composition and preferably in the approximate of said composition and preferably in the approximate 0.1% to 1% level. In laboratory tests this compounded rubber composition, containing the anti-oxidant, was worked and blended by conventional techniques and cured at 275° F. for twenty minutes in an hydraulic press.

The effectiveness of the stabilizers herein described as anti-oxidants, is indicated by the following test results carried out with the specific rubber composition described above containing anti-oxidant in the amounts and manner shown below.

Example 1. No anti-oxidant
Example 2. 0.1 pt. dibutyl tin maleate
Example 3. 0.25 pt. dibutyl tin dilaurate
Example 4. 0.50 pt. dibutyl tin salt of maleic acid partially esterified with isooctyl alchol
Example 5. 1.0 pt. dibutyl tin diacetate
Example 6. 1.5 pt. dibutyl tin mixed maleate-laurate salt
Example 7. 1 pt. commercial anti-oxidant The test methods employed to determine the anti-oxidant properties consisted of (1) outdoor exposure and (2) the Oxygen Bomb Test—ASTM Procedure D-572-48. The outdoor exposure test samples were examined for tackiness, surface checking and discoloration. The oxygen bomb test samples were examined for changes in tensile strength, elongation and modulus with the standard equipment.

The results of the tests on the examples described above were as follows:

*Outdoor exposure—60 days*

| Sample | Color | Tackiness | Surface Checking |
|---|---|---|---|
| Ex. 1 | No discoloration | Pronounced | Pronounced. |
| Ex. 2 | do | None | Very slight. |
| Ex. 3 | do | do | Do. |
| Ex. 4 | do | do | Do. |
| Ex. 5 | do | do | Do. |
| Ex. 6 | do | do | Do. |
| Ex. 7 | Discolored | Slight | Pronounced. |

*Oxygen bomb test—4 days @ 70° C.*

| Sample | Modulus (p. s. i.) 200% Elongation | | (p. s. i.) Tensile Strength | | Percent Elongation | |
|---|---|---|---|---|---|---|
|  | Orig. | Aged | Orig. | Aged | Orig. | Aged |
| Ex. 1 | 270 | 270 | 2,980 | 1,300 | 600 | 500 |
| Ex. 2 | 290 | 310 | 3,000 | 2,400 | 625 | 560 |
| Ex. 3 | 280 | 315 | 3,000 | 2,250 | 640 | 540 |
| Ex. 4 | 280 | 310 | 3,050 | 2,300 | 645 | 540 |
| Ex. 5 | 245 | 305 | 3,000 | 2,100 | 630 | 520 |
| Ex. 6 | 230 | 295 | 2,950 | 2,300 | 660 | 520 |
| Ex. 7 | 250 | 315 | 3,210 | 2,400 | 645 | 525 |

Similar tests on GR-S rubber (1,3 butadiene-styrene) indicate that the stabilization of synthetic rubber with organotin derivatives of the type described, is just as pronounced as it is in the case of natural rubber.

Although the examples show the stabilizer used with natural rubber crepe and with coagulated GR-S (1,3 butadiene and styrene), incorporation of the stabilizer into latices is possible. The latices would then be processed in the usual manner.

The rubber composition to be stabilized may contain pigments to impart any desired color or decorative effect to the final product. The stabilizer will cause the rubber composition to maintain its color whether it is black, white or any other color.

While the invention has been described with reference to various examples and embodiments, it will be apparent to those skilled in the art that various modifications may be made, and equivalents substituted therefor, without departing from the principles and true nature of the invention.

We claim:

1. A rubber composition comprising as a basic ingredient a rubbery polymer selected from the class consisting of natural rubber, copolymers of 1,3 butadiene and styrene, and copolymers of 1,3 butadiene and acrylonitrile, and containing a stabilizing amount of a hydrocarbontin carboxylate.

2. A rubber composition as described in claim 1, wherein the stabilizer is present in the amount of .05 to 5% based on the weight of the basic rubber ingredient.

3. A rubber composition as described in claim 1, wherein said composition is cured.

4. A rubber composition as described in claim 1, wherein said composition contains pigments.

5. A rubber composition according to claim 1, wherein the hydrocarbontin carboxylate is an alkyltin carboxylate and the rubbery polymer is a copolymer of 1,3 butadiene and styrene.

6. A rubber composition according to claim 1, wherein the hydrocarbontin carboxylate is dibutyltin maleate and the rubbery polymer is a copolymer of 1,3 butadiene and styrene.

7. A rubber composition according to claim 1, wherein the hydrocarbontin carboxylate is dibutyl tin dilaurate and the rubbery polymer is a copolymer of 1,3 butadiene and styrene.

8. A rubber composition according to claim 1, wherein the hydrocarbontin carboxylate is a dibutyl tin salt of maleic acid partially esterified with isooctyl alcohol, and the rubbery polymer is a copolymer of 1,3 butadiene and styrene.

9. A rubber composition according to claim 1, wherein the hydrocarbontin carboxylate is dibutyl tin diacetate and the rubbery polymer is a copolymer of 1,3 butadiene and styrene.

10. A rubber composition according to claim 1, wherein the hydrocarbontin carboxylate is a dibutyl tin mixed maleate-laurate salt and the rubbery polymer is a copolymer of 1,3 butadiene and styrene.

11. A method of treating a rubber composition comprising as a basic ingredient a rubbery polymer selected from the class consisting of natural rubber, copolymers of 1,3 butadiene and styrene, and copolymers of 1,3 butadiene and acrylonitrile which comprises curing said rubber composition in the presence of a stabilizing amount of a hydrocarbontin carboxylate.

12. A method according to claim 11, wherein the stabilizer is present in the amount of about .05 to 5% based on the weight of rubbery polymer.

13. A method according to claim 11, wherein the hydrocarbontin carboxylate is an alkyl tin carboxylate and the rubbery polymer is a copolymer of 1,3 butadiene and styrene.

References Cited in the file of this patent

UNITED STATES PATENTS

| | | |
|---|---|---|
| 2,307,092 | Yngve | Jan. 5, 1943 |
| 2,648,650 | Weinberg et al. | Aug. 11, 1953 |